United States Patent
Suzuki

(10) Patent No.: US 8,718,916 B2
(45) Date of Patent: May 6, 2014

(54) OBJECT DETECTING DEVICE, AND OBJECT DETECTING METHOD

(75) Inventor: Koji Suzuki, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1109 days.

(21) Appl. No.: 12/597,355

(22) PCT Filed: May 8, 2008

(86) PCT No.: PCT/JP2008/058894
§ 371 (c)(1),
(2), (4) Date: Oct. 23, 2009

(87) PCT Pub. No.: WO2008/143114
PCT Pub. Date: Nov. 27, 2008

(65) Prior Publication Data
US 2010/0131153 A1     May 27, 2010

(30) Foreign Application Priority Data

May 11, 2007   (JP) ................... 2007-127213

(51) Int. Cl.
*G08G 1/16*     (2006.01)
(52) U.S. Cl.
USPC ............ 701/300; 701/301; 340/435; 342/70; 342/114
(58) Field of Classification Search
USPC ............ 340/435, 436, 903; 342/52, 70, 114; 701/36, 45, 93, 300, 301
See application file for complete search history.

(56) References Cited

U.S. PATENT DOCUMENTS

| 5,473,538 A | * | 12/1995 | Fujita et al. | 701/45 |
| 6,031,484 A | * | 2/2000 | Bullinger et al. | 342/72 |
| 7,363,155 B2 | * | 4/2008 | Meister et al. | 701/301 |
| 2001/0025211 A1 | | 9/2001 | Shirai et al. | |
| 2003/0045991 A1 | * | 3/2003 | Isogai et al. | 701/96 |

(Continued)

FOREIGN PATENT DOCUMENTS

| DE | 198 45 568 A1 | 10/1999 |
| DE | 10 2005 003 194 A1 | 7/2006 |

(Continued)

OTHER PUBLICATIONS

Japanese Office Action issued in Application No. 2007-127213; Dated Dec. 7, 2010 (With Translation).

(Continued)

*Primary Examiner* — Stephen Holwerda
(74) *Attorney, Agent, or Firm* — Oliff PLC

(57) ABSTRACT

An object detecting device and an object detecting method capable of performing appropriate object detection that distinguishes an approaching moving object from a stationary object accurately. The relative velocity of an object, which exists in the lateral direction of a vehicle, with respect to the vehicle is detected, the absolute velocity of the object in the horizontal direction of the vehicle is calculated on the basis of the detection signal, and it is determined whether or not the object is an approaching moving object on the basis of the absolute velocity of the object in the horizontal direction of the vehicle. Accordingly, since it is possible to accurately distinguish whether an object existing in the lateral or oblique direction of the vehicle is an approaching moving object or a stationary object, it is possible to appropriately determine whether or not the object is an approaching moving object.

6 Claims, 4 Drawing Sheets

(56) References Cited

U.S. PATENT DOCUMENTS

| | | | |
|---|---|---|---|
| 2004/0012516 A1* | 1/2004 | Schiffmann et al. | 342/70 |
| 2006/0031015 A1* | 2/2006 | Paradie | 701/301 |
| 2006/0058964 A1* | 3/2006 | Lucas et al. | 701/301 |
| 2006/0190175 A1* | 8/2006 | Moriizumi et al. | 701/301 |
| 2007/0050114 A1* | 3/2007 | Koike et al. | 701/45 |

FOREIGN PATENT DOCUMENTS

| | | |
|---|---|---|
| JP | A-08-315300 | 11/1996 |
| JP | A-9-188206 | 7/1997 |
| JP | A-2001-202599 | 7/2001 |
| JP | A-2005-10893 | 1/2005 |
| JP | A-2005-82124 | 3/2005 |
| JP | A-2006-99155 | 4/2006 |
| JP | A-2006-146948 | 6/2006 |
| JP | A-2006-188129 | 7/2006 |
| JP | A-2006-221498 | 8/2006 |
| JP | A-2006-298105 | 11/2006 |
| JP | A-2007-4711 | 1/2007 |
| WO | WO 2004/068165 A1 | 8/2004 |
| WO | WO 2005054008 A1 * | 6/2005 |

OTHER PUBLICATIONS

European Search Report issued in Application No. 08 75 2755.2; dated Sep. 17, 2010.

International Search Report issued in Application No. PCT/JP2008/058894; dated Jul. 8, 2008.

International Preliminary Report on Patentability issued on Nov. 24, 2009 in corresponding International Application No. PCT/JP2008/058894.

* cited by examiner

OBJECT DETECTING DEVICE, AND OBJECT DETECTING METHOD

TECHNICAL FIELD

The present invention relates to an object detecting device installed in a vehicle and an object detecting method.

BACKGROUND ART

As a known object detecting device installed in a vehicle, there is an object detecting device which detects an object in front of the vehicle, detects the relative positional relationship between the front object and the vehicle, and determines a possibility of collision between the vehicle and the front object on the basis of the relative positional relationship, as disclosed in JP-A-2005-10893.

DISCLOSURE OF THE INVENTION

In such a device, there is a case where it is difficult to appropriately detect an object approaching from the lateral or oblique direction of the vehicle. For example, in order to detect an object approaching from the lateral or oblique direction of the vehicle, it may be considered to make the detection direction of a sensor inclined with respect to the traveling direction of the vehicle. In this case, it is easy to detect an object approaching from the lateral direction of the vehicle, but it is difficult to identify a stationary object placed on the road or the like and a moving object approaching from the oblique direction of the vehicle.

That is, when detecting the relative velocity of the object while the vehicle is traveling, the detected relative velocity of the stationary object at the side of the road is gradually decreased as the vehicle approaches the stationary object. This is because the detection direction is different from the approaching direction. In addition, the detected relative velocity of the moving object approaching from the lateral direction of the vehicle is also gradually decreased as the moving object approaches the vehicle. For this reason, since it is difficult to distinguish the moving object approaching from the lateral direction of the vehicle from the stationary object placed at the side of the road, it is difficult to appropriately detect the moving object approaching from the lateral direction of the vehicle.

Therefore, it is an object of the present invention to provide an object detecting device and an object detecting method capable of performing appropriate object detection by accurately distinguishing an approaching moving object from a stationary object.

That is, an object detecting device according to the present invention is configured to include: a detection unit that detects the relative velocity of an object, which exists in the lateral direction of a vehicle, with respect to the vehicle; a velocity calculating unit that calculates the absolute velocity of the object in the horizontal direction of the vehicle on the basis of a detection signal of the detection unit; and a determination unit that determines whether or not the object is an approaching moving object on the basis of the absolute velocity of the object in the horizontal direction of the vehicle calculated by the velocity calculating unit.

According to the present invention, by determining whether or not an object is an approaching moving object on the basis of the absolute velocity of the object in the horizontal direction of the vehicle, it is possible to accurately distinguish whether an object existing in the lateral or oblique direction of the vehicle is an approaching moving object or a stationary object. As a result, it is possible to appropriately determine whether or not the object is an approaching moving object.

In addition, in the object detecting device according to the present invention, it is preferable that the detection unit be installed in the vehicle with a direction crossing the longitudinal direction of the vehicle as the central direction of detection.

According to the present invention, appropriate object detection can be performed by accurately distinguishing an approaching moving object from a stationary object by detecting the absolute velocity of the object in the horizontal direction of the vehicle.

In addition, an object detecting method according to the present invention is configured to include: a detection step of detecting the relative velocity of an object, which exists in the lateral direction of a vehicle, with respect to the vehicle; a velocity calculating step of calculating the absolute velocity of the object in the horizontal direction of the vehicle on the basis of a detection signal in the detection step; and a determination step of determining whether or not the object is an approaching moving object on the basis of the absolute velocity of the object in the horizontal direction of the vehicle calculated in the velocity calculating step.

According to the present invention, by determining whether or not an object is an approaching moving object on the basis of the absolute velocity of the object in the horizontal direction of the vehicle, it is possible to accurately distinguish whether an object existing in the lateral or oblique direction of the vehicle is an approaching moving object or a stationary object. As a result, it is possible to appropriately determine whether or not the object is an approaching moving object.

BEST MODE FOR CARRYING OUT THE INVENTION

Figure 1:
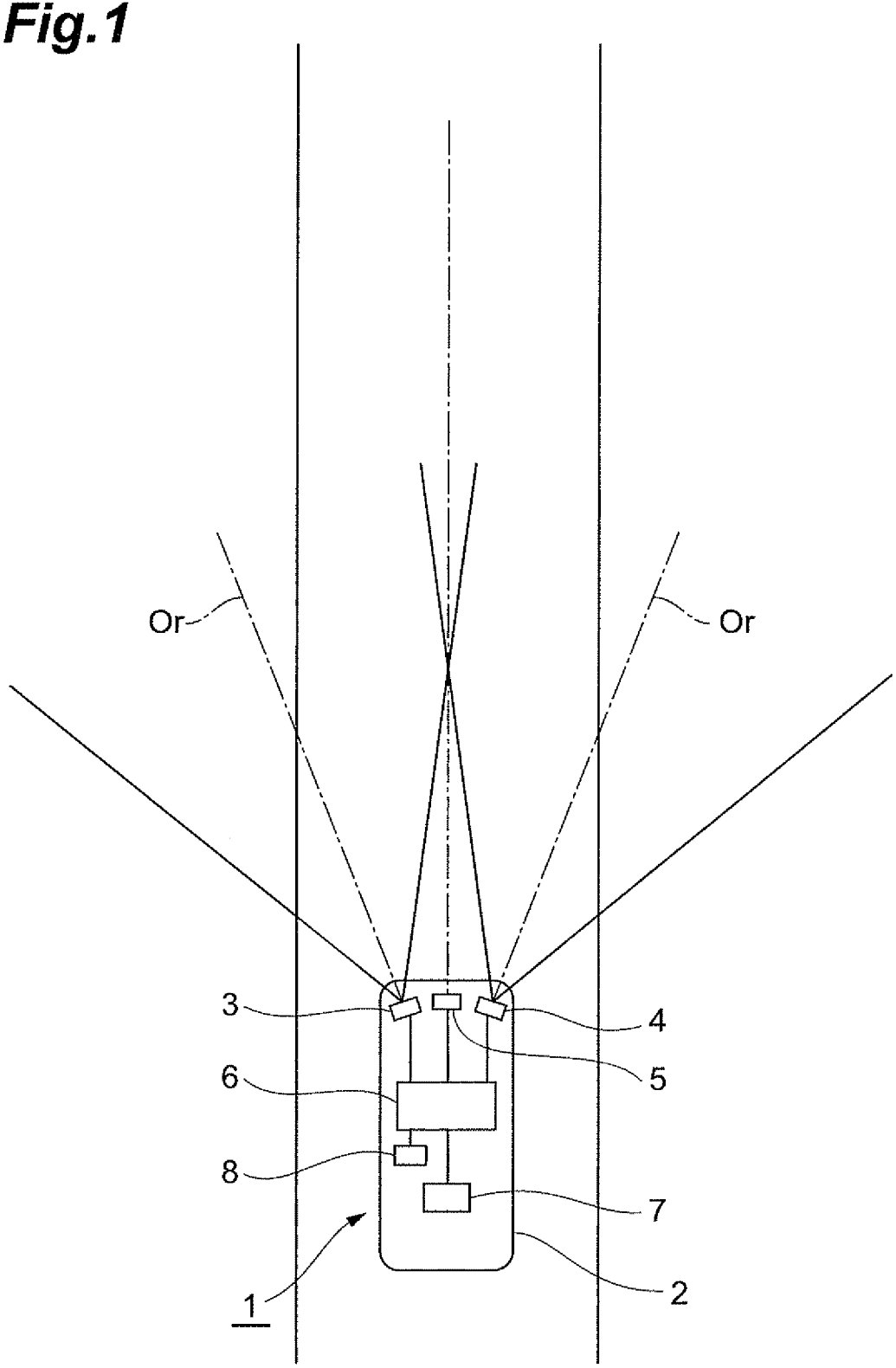
FIG. 1 is a view illustrating the schematic configuration of an object detecting device according to an embodiment of the present invention.

Hereinafter, an embodiment of the present invention will be described in detail with reference to the accompanying drawings. In addition, the same elements are denoted by the same reference numerals in explaining the drawings, and the repeated explanation thereof is omitted.

FIG. 1 is a view illustrating the schematic configuration of an object detecting device according to an embodiment of the present invention.

As shown in FIG. 1, an object detecting device 1 according to the present embodiment is a device that detects an object around a vehicle by radars 3, 4, and 5 installed in a vehicle 2. For example, the object detecting device 1 is used as an object detecting means, such as an auto cruise control system for following a preceding vehicle at the time of traffic congestion, a pre-crash brake assist system, and a pre-crash seatbelt system.

The radars 3 and 4 of the object detecting device 1 according to the present embodiment function as a detection unit that detects the lateral direction (including the direction inclined with respect to the traveling direction) of the vehicle 2, and detect a predetermined angle range from the central direction of detection with a direction crossing the longitudinal direction of the vehicle 2 as a central direction of detection. For example, the radar 3 is fixed to a front left portion of the vehicle 2, is installed with the front left direction of the vehicle 2 as the central direction of detection, and senses the front left region of the vehicle 2. In addition, the radar 4 is fixed to a front right portion of the vehicle 2, is installed with the front right direction of the vehicle 2 as the central direction of detection, and senses the front right region of the vehicle 2.

As the radars 3 and 4, for example, millimeter wave radars are used. Preferably, FM-CW millimeter wave radars are used. The radars 3 and 4 transmit an electric wave with a predetermined frequency to the detection region and receive an observation wave reflected by an object or the like. By performing signal analysis of the received signal, the relative velocity of the object with respect to the vehicle 2 and the distance from the vehicle 2 can be detected.

The radar 5 functions as a detection unit that detects the front of the vehicle 2, and has the front direction of the vehicle 2 as a central direction of detection and detects a predetermined angle range from the central direction of detection. For example, the radar 5 is fixed at the middle position of the front portion of the vehicle 2, is installed with the front direction of the vehicle 2 as the detection direction, and senses the front region of the vehicle 2.

As the radar 5, for example, a millimeter wave radar is used. Preferably, an FM-CW millimeter wave radar is used. The radar 5 transmits an electric wave with a predetermined frequency to the detection region and receives an observation wave reflected by an object or the like. By performing signal analysis of the received signal, the relative velocity of the object with respect to the vehicle 2 and the distance from the vehicle 2 can be detected. Moreover, in FIG. 1, the detection region of the radar 5 is not shown for convenience of explanation.

Although radars capable of detecting the detection region of the same range as that of the radar 5 may be used as the radars 3 and 4, radars having the detection distance shorter than that of the radar 5 may also be used. Also in this case, since the approach of other vehicles from the lateral direction can be sufficiently detected, the power consumption when the radars 3 and 4 operate can be suppressed to be low. In addition, the radar 5 may not be installed when the front region of the vehicle can be sufficiently detected by the radars 3 and 4.

The object detecting device 1 includes an ECU (Electronic Control Unit) 6. The ECU 6 performs overall control of the entire object detecting device 1 and is configured to include as a main subject a computer including a CPU, a ROM, and a RAM, for example.

The ECU 6 is connected to the radars 3, 4, and 5 so that each detection signal is input to the ECU 6. In addition, the ECU 6 calculates the relative velocity of an object or the like existing in the detection region and the distance to the vehicle 2 by performing signal processing on the detection signals. In addition, the ECU 6 functions as a velocity calculating unit that calculates the absolute velocity of the object, which exists in the lateral direction of the vehicle 2, in the horizontal direction (vehicle width direction) of the vehicle on the basis of the detection signals of the radars 3 and 4. In addition, the ECU 6 functions as a determination unit that determines whether or not the object is an approaching moving object on the basis of the calculated absolute velocity of the object in the horizontal direction of the vehicle.

The object detecting device 1 includes a vehicle velocity sensor 7. The vehicle velocity sensor 7 functions as a vehicle velocity detecting unit that detects the travel velocity of the vehicle 2 and, for example, a wheel velocity sensor is used. The vehicle velocity sensor 7 is connected to the ECU 6, and the detection signal is input to the ECU 6.

In addition, it is preferable to provide an alarm section 8 in the object detecting device 1. The alarm section 8 functions as an alarming means that alarms the driver of the vehicle 2 when an object approaching the vehicle 2 is detected. Anything capable of warning the driver of the approach of an object may be used as the alarm section 8. For example, a warning of the occurrence of trouble may be given through visual methods, such as lamp lighting, LED lighting, and liquid crystal display, or acoustic methods, such as a buzzer and sound. The alarm section 8 is connected to the ECU 6 and performs an alarm operation when an alarm instruction signal is output from the ECU 6.

Figure 2:
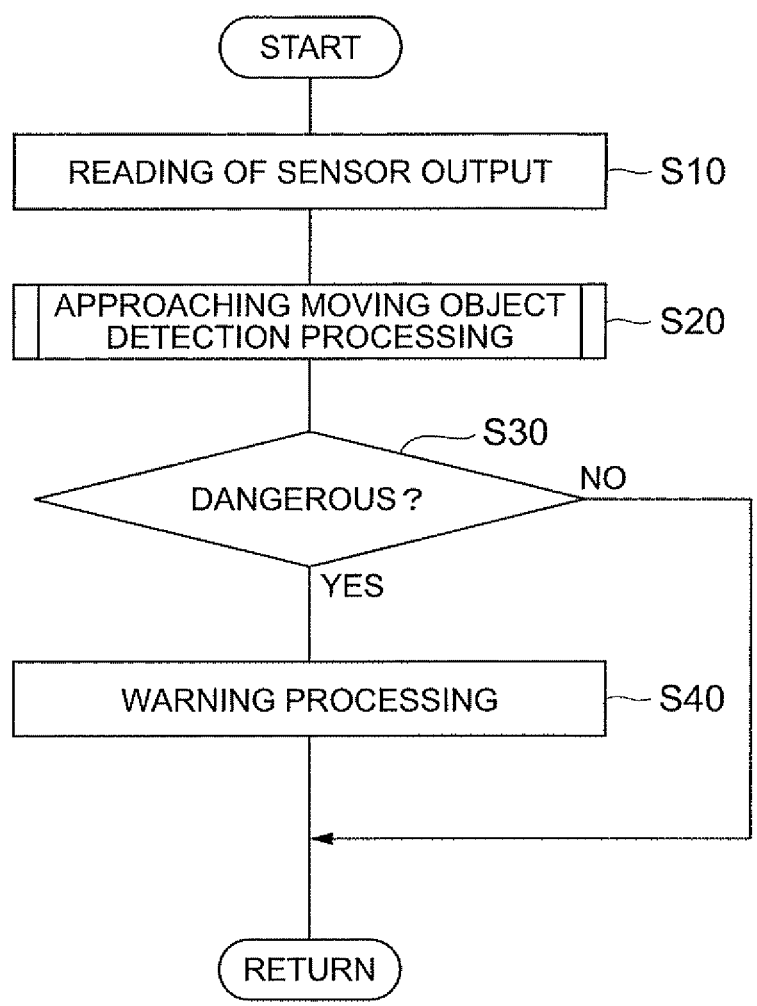
FIG. 2 is a flow chart illustrating the object detection processing in the object detecting device and the object detecting method in FIG. 1.
Figure 3:
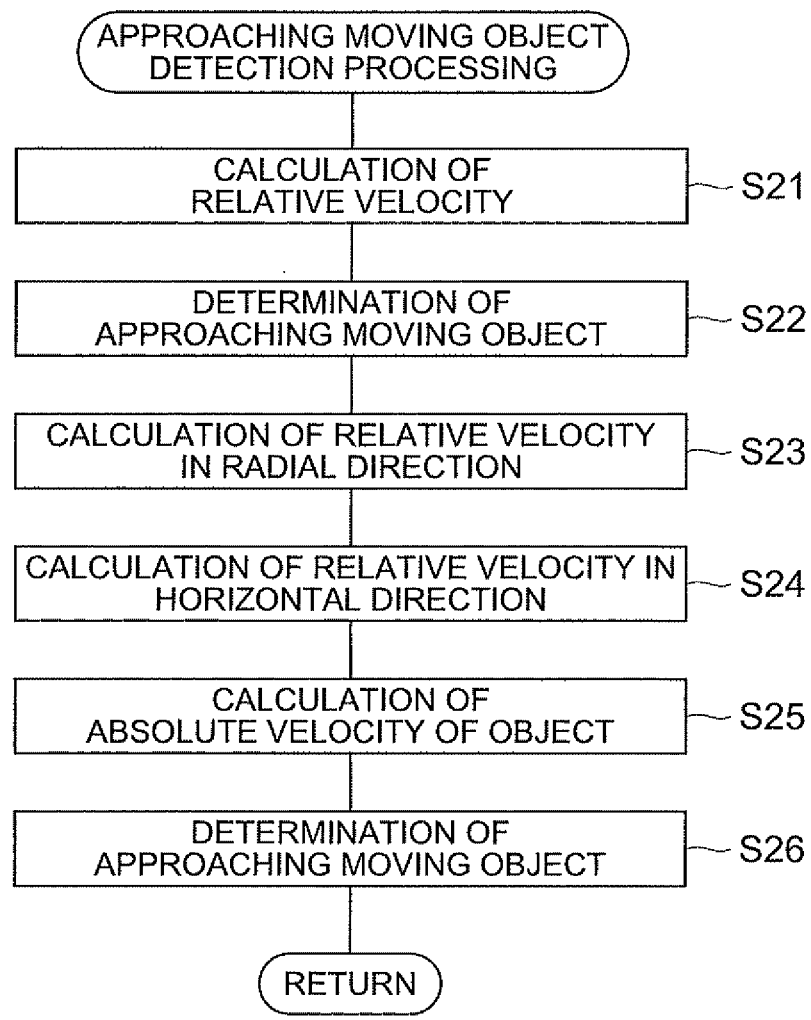
FIG. 3 is a flow chart illustrating the approaching moving object detection processing in the object detecting device and the object detecting method in FIG. 1.
Figure 4:
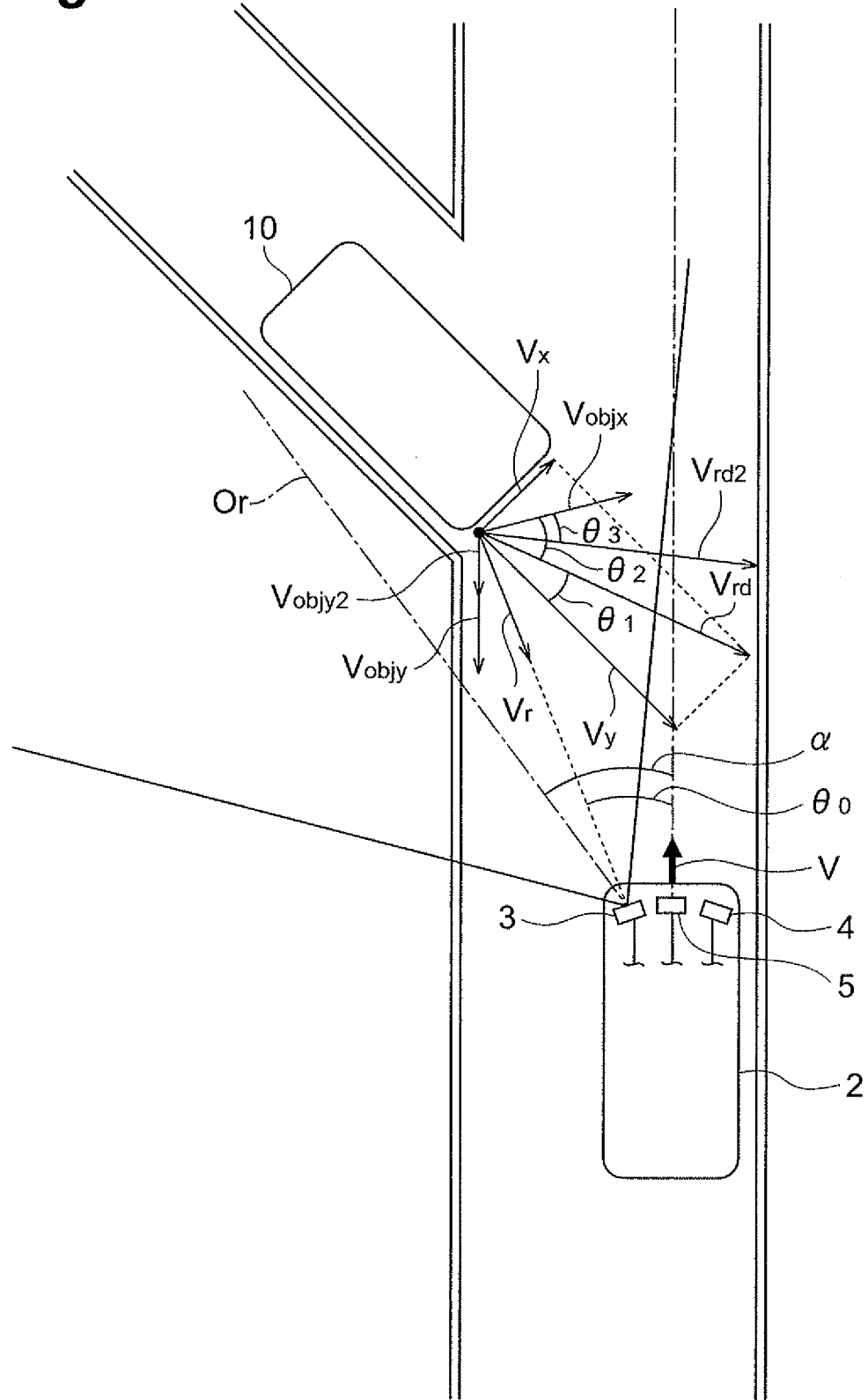
FIG. 4 is an explanatory view when the object detecting device in FIG. 1 performs lateral object detection.

Next, an operation of the object detecting device 1 according to the present embodiment will be described. FIG. 2 is a flow chart illustrating the object detection processing of the object detecting device 1 and the object detecting method according to the present embodiment. Control processing in FIG. 2 is repeatedly executed for every predetermined time by the ECU 6, for example. FIG. 3 is a flow chart illustrating the approaching moving object detection processing of the object detecting device 1 according to the present embodiment. FIG. 4 is an explanatory view at the time of the approach of the vehicle from the lateral direction in the object detecting device 1 according to the present embodiment. In FIG. 4, the case where another vehicle 10 approaching from the lateral direction is detected by the radar 3 is shown.

The object detecting device 1 operates when the vehicle 2 travels and detects an object in the detection region around the vehicle 2 by the radars 3, 4, and 5. As the object detection processing in this case, reading processing of the sensor output is first performed as shown in S10 of FIG. 2. That is, the detection signals of the radars 3, 4, and 5 and the detection signal of the vehicle velocity sensor 7 are read. As the detection signals of the radars 3, 4, and 5, for example, a beat signal obtained by mixing a transmitted wave and a received wave is read.

Then, the process proceeds to S20 in which the approaching moving object detection processing is performed. The approaching moving object detection processing is processing for calculating the relative velocity of the detected object with respect to the vehicle 2 on the basis of the sensor output information, calculating the absolute velocity of the object, and detecting whether or not the detected object is an approaching moving object on the basis of the absolute velocity component of the object in the horizontal direction (vehicle width direction) of the vehicle 2. Details of the approaching moving object detection processing will be described later.

Then, the process proceeds to S30 where when the approaching moving object which approaches the vehicle 2 has been detected in the approaching moving object detection processing, it is determined whether or not the approach is dangerous. When it is determined that there is no danger in S30, the control processing series is ended. On the other hand, when it is determined that there is a danger in S30 (S40), warning processing is performed.

The warning processing is processing for warning the driver of the vehicle 2 that there is an approaching moving object. For example, the alarm section 8 receives a command signal from the ECU 6 and performs a warning operation by lamp lighting, panel display, buzzer output, voice output, and the like. Then, when the warning processing of S40 is finished, the control processing series is ended.

According to the object detection processing, the object detection can be performed by determining accurately whether the detected object is an approaching moving object or a stationary object by calculating the relative velocity of the detected object with respect to the vehicle 2, calculating the absolute velocity of the object, and determining whether or not the detected object is an approaching moving object on the basis of the absolute velocity component of the object in the horizontal direction (vehicle width direction) of the vehicle 2. Accordingly, the danger of the approaching moving object can be determined appropriately.

Next, the approaching moving object detection processing of the object detecting device 1 and the object detecting method according to the present embodiment will be described.

The approaching moving object detection processing is processing executed in S20 of FIG. 2, and the absolute velocity of the detected object in the horizontal direction of the vehicle 2 is calculated and it is determined whether or not the object is an approaching moving object on the basis of the absolute velocity. This approaching moving object detection processing is suitable for detecting the approaching moving object from the lateral direction and is mainly performed on the basis of the detection signals of the radars 3 and 4.

First, as shown in S21 of FIG. 3, processing for calculating the relative velocity of the detected object with respect to the vehicle 2 is performed. The relative velocity calculation processing is processing for calculating the relative velocity of the detected object with respect to the vehicle 2 and is performed by performing signal processing of the beat signals in the radars 3 and 4.

Then, the process proceeds to S22 in which determination processing is performed on the approaching moving object. This determination processing is processing for determining whether or not the detected object is an approaching moving object. For example, it is determined whether the detected object is an approaching moving object, a moving object becoming distant, or a stationary object on the basis of whether or not the following determination expressions (1) and (2) shown below are satisfied.

$$V \cdot \cos|\theta 0| + Vr > THVR1 \tag{1}$$

$$V \cdot \cos|\theta 0| + Vr < THVR2 \tag{2}$$

In these determination expressions (1) and (2), 'V' is a travel velocity of the vehicle 2, 'Vr' is a relative velocity of the vehicle 2 with respect to the object, and 'θ0' is an angle formed by the traveling direction of the vehicle 2 and the direction from the vehicle 2 to the object (refer to FIG. 4). V·cos|θ0| expresses a velocity component of the vehicle velocity in the direction from the vehicle 2 to the object. THVR1 is a threshold value for determination on becoming distant, and a positive velocity value is set. THVR2 is a threshold value for approach determination, and a negative velocity value is set.

When the determination expression (1) is satisfied, it is determined that the detected object is a moving object becoming distant. When the determination expression (2) is satisfied, the detected object is determined to be an approaching moving object and is temporarily registered as an approaching moving object. In addition, when the determination expressions (1) and (2) are not satisfied, it is determined that the detected object is a stationary object.

Then, the process proceeds to S23 in which processing for calculating the relative velocity in the radial direction is performed. The processing for calculating the relative velocity in the radial direction is processing for calculating the relative velocity Vrd in the radial direction of the object by composition of the horizontal velocity Vx and the longitudinal velocity Vy with respect to the radar axis (detection direction) Or. The relative velocity Vrd is calculated by the following expression (3), for example.

$$Vrd = (Vx^2 + Vy^2)^{1/2} \tag{3}$$

'Vx' is a horizontal velocity component of the object in a direction perpendicular to the radar axis Or and is calculated on the basis of the velocity value and velocity direction of the relative velocity Yr. 'Vy' is a longitudinal velocity component of the object in a direction parallel to the radar axis Or and is calculated on the basis of the velocity value and velocity direction of the relative velocity Vr.

Then, the process proceeds to S24 in which the processing for calculating the relative velocity of the object in the horizontal direction with respect to the traveling direction of the vehicle 2 and the relative velocity of the object with respect to the traveling direction of the vehicle 2 is performed. The relative velocity Vobjx of the object in the horizontal direction (vehicle width direction) with respect to the traveling direction of the vehicle 2 is calculated by the following expression (4).

$$Vobjx = |Vrd| \cdot \cos \theta 2 \tag{4}$$

In this expression (4), 'θ2' is an angle formed by the direction of the relative velocity Vrd in the radial direction and the horizontal direction of the vehicle 2 and is calculated by the following expression (5).

$$\theta 2 = 90 - \alpha - \theta 1 \tag{5}$$

In this expression (5), α is a setting angle of the radar 3 and is expressed as an angle formed by the longitudinal direction of the vehicle 2 and the central direction of detection (radar axis Or) of the radar 3. In addition, 'θ1' is an angle formed by the direction of the longitudinal velocity Vy and the direction of the relative velocity Vrd and is expressed by the following expression (6).

$$\theta 1 = \arctan(Vx/Vy) \tag{6}$$

The relative velocity Vobjy of the object with respect to the traveling direction of the vehicle 2 is calculated by the following expression (7).

$$Vobjy = |Vrd| \cdot \sin \theta 2 \tag{7}$$

Then, the process proceeds to S25 in which the processing for calculating the absolute velocity of the object is performed. This calculation processing is processing for calculating the absolute velocity of the detected object. For example, the absolute velocity Vrd2 of the object is calculated by the following expression (8).

$$Vrd2 = (Vobjx^2 + Vobjy2^2)^{1/2} \tag{8}$$

In this expression (8), 'Vobjy2' is the absolute velocity of the object in the vehicle traveling direction, which is obtained by subtracting the vehicle velocity V of the vehicle 2 from the relative velocity Vobjy of the object with respect to the traveling direction of the vehicle 2. The absolute velocity Vobjy2 in the vehicle traveling direction of the object is expressed by the following expression (9).

$$Vobjy2 = Vobjy - V \tag{9}$$

The direction of the absolute velocity Vrd2 of the object is a direction inclined by θ3 from the horizontal direction of the vehicle 2. The θ3 is expressed by the following expression (10).

$$\theta 3 = \arctan(Vobjx/Vrd2) \quad (10)$$

'Vobjx' is a velocity component of the absolute velocity Vrd2 of the object in the horizontal direction of the vehicle 2 and is an absolute velocity of the object in the horizontal direction of the vehicle 2. In addition, 'Vobjy2' is a velocity component of the absolute velocity Vrd2 of the object in the traveling direction of the vehicle 2 and is an absolute velocity of the object in the traveling direction of the vehicle 2.

Then, the process proceeds to S26 in which it is determined whether or not the detected object is an approaching moving object. That is, in S22, an object temporarily registered as an approaching moving object is determined to be an approaching moving object and is finally registered. In addition, in S22, it is determined whether or not an object not determined to be an approaching moving object is an approaching moving object on the basis of the absolute velocity (Vobjx) of the object in the horizontal direction of the vehicle 2.

For example, it is determined whether the continuous number of times, in which the absolute velocity Vobjx of the object in the horizontal direction of the vehicle 2 is equal to or larger than the velocity determination threshold value THobjx1, is equal to or larger than the threshold value THobjxcnt1 for determination of the number of times. In this determination, a state of the absolute velocity Vobjx is determined using the determination result when repeatedly performing the velocity calculation of the object at predetermined periods. In this case, for the number of times of determination, it may be determined whether the number of times, in which the absolute velocity Vobjx is equal to or larger than the velocity determination threshold THobjx1, of the predetermined number of times is equal to or larger than the threshold value THobjxcnt1 for determination of the number of times.

In addition, when the continuous number of times, in which the absolute velocity Vobjx of the object in the horizontal direction of the vehicle 2 is equal to or larger than the velocity determination threshold value THobjx1, is equal to or larger than the threshold value THobjxcnt1 for determination of the number of times, the object is determined to be an approaching moving object and is finally registered. On the other hand, when the continuous number of times, in which the absolute velocity Vobjx of the object in the horizontal direction of the vehicle 2 is equal to or larger than the velocity determination threshold value THobjx1, is not equal to or larger than the threshold value THobjxcnt1 for determination of the number of times, it is determined that the object is not an approaching moving object.

In addition, when the continuous number of times, in which the absolute velocity Vobjx of the object in the horizontal direction of the vehicle 2 is equal to or larger than the velocity determination threshold value THobjx1, is not equal to or larger than the threshold value THobjxcnt1 for determination on the number of times, it is preferable that the object be determined to be an approaching moving object under predetermined conditions if there is a possibility that the object will collide with the vehicle 2. For example, the collision possibility of an object and a front portion (for example, a front bumper portion) of the vehicle 2 is determined on the basis of the absolute velocity Vrd2 and absolute position of the object and the velocity V and absolute position of the vehicle 2. When the collision possibility is equal to or larger than a predetermined level, the velocity determination threshold value THobjx1 and the threshold value THobjxcnt1 for determination of the number of times are changed to threshold values by which a determination as an approaching moving object is easily made, and it is determined again whether or not the object is an approaching moving object. Then, when the determination processing of the approaching moving object of S26 is finished, the control processing series of the approaching moving object detection processing is ended.

According to the approaching moving object detection processing of the object detecting device 1 and object detecting method according to the present embodiment, it is possible to accurately determine whether or not an object is an approaching moving object by determining whether or not the object is an approaching moving object on the basis of the absolute velocity Vobjx of the object in the horizontal direction (vehicle width direction) of the vehicle 2.

In addition, although the absolute velocity Vobjx of the object in the horizontal direction of the vehicle 2 is calculated and it is determined whether or not the object is an approaching moving object on the basis of the calculated absolute velocity Vobjxn in the approaching moving object detection processing described above, it may be determined whether or not the object is an approaching moving object on the basis of the absolute velocity of the object in the horizontal direction of the vehicle 2 using other methods. For example, it may be determined whether or not the object is an approaching moving object on the basis of the relative velocity and relative position of the object with respect to the vehicle 2 using a table, a map, and the like. Specifically, it is preferable to set a table or a map, which is used for determination, on the basis of the absolute velocity Vobjx of the object in the horizontal direction of the vehicle 2 obtained on the basis of the relative velocity and relative position of the object with respect to the vehicle 2 and to determine whether or not the object is an approaching moving object using the table or the map.

As described above, according to the object detecting device 1 and the object detecting method according to the present embodiment, it is determined whether or not the object is an approaching moving object on the basis of the absolute velocity of the object in the horizontal direction of the vehicle 2. Accordingly, since it is possible to accurately distinguish whether an object existing in the lateral or oblique direction of the vehicle 2 is an approaching moving object or a stationary object, it is possible to appropriately determine whether or not the object is an approaching moving object.

In addition, each embodiment described above shows an example of the object detecting device and object detecting method according to the present invention. The object detecting device and the object detecting method according to the present invention are not limited to those described above, and the object detecting device and the object detecting method according to the embodiment may be modified or applied to other things without departing from the scope of the present invention as defined in the appended claims.

For example, in each embodiment described above, the case where the FM-CW radar is used as a detection unit has been described. However, the object detecting device according to the present invention is not limited to such a method, and detection units other than the FM-CW radar may also be used.

INDUSTRIAL APPLICABILITY

The present invention can perform appropriate object detection by distinguishing an approaching moving object from a stationary object accurately by detecting the absolute velocity of the object in the horizontal direction of the vehicle.

The invention claimed is:

1. An object detecting device comprising:
a detection unit that is installed in a vehicle with a direction crossing the longitudinal direction of the vehicle as the central direction of detection and that detects the relative velocity of an object, which exists in the lateral direction of the vehicle, with respect to the vehicle;
a velocity calculating unit that calculates the absolute velocity of the object in the vehicle width direction with respect to the traveling direction of the vehicle on the basis of a detection signal of the detection unit; and
a determination unit that is configured to determine:
  (i) whether the object is an approaching moving object on the basis of the relative velocity of the object with respect to the vehicle detected by the detection unit and a velocity component of the vehicle velocity in the direction from the vehicle to the object, and
  (ii) whether the object is an approaching moving object on the basis of the absolute velocity of the object in the vehicle width direction with respect to the traveling direction of the vehicle calculated by the velocity calculating unit,
wherein when it is determined that the object is not approaching based on the relative velocity of the object, the determination unit determines whether the object is an approaching object based on the absolute velocity of the object.

2. An object detecting device comprising:
a speed detector that is installed in a vehicle with a direction crossing the longitudinal direction of the vehicle as the central direction of detection and that detects the relative velocity of an object, which exists in the lateral direction of the vehicle, with respect to the vehicle;
a velocity calculator that calculates the absolute velocity of the object in the vehicle width direction with respect to the traveling direction of the vehicle on the basis of a detection signal of the speed detector; and
a determination unit that is configured to determine:
  (i) the collision possibility of the object and the vehicle on the basis of the absolute velocity of the object in the vehicle width direction with respect to the traveling direction of the vehicle calculated by the velocity calculator and the absolute position of the object as well as the travel velocity and absolute position of the vehicle,
  (ii) whether or not the object is an approaching moving object on the basis of the absolute velocity of the object in the vehicle width direction with respect to the traveling direction of the vehicle calculated by the velocity calculator,
wherein when the determination unit determines the possibility of collision, the determination unit changes a threshold. value for determining whether the object is an approaching moving object to a value by which a determination of an approaching moving object is more quickly made and determines whether the object is an approaching moving object based on the absolute velocity of the object in the vehicle width direction with respect to the traveling direction of the vehicle calculated by the velocity calculator.

3. The object detecting device according to claim 1, wherein the detection unit is a millimeter wave radar.

4. The object detecting device according to claim 1, further comprising an electronic control unit that includes the velocity calculating unit and the determination unit.

5. An object detecting method comprising:
a detection step of detecting the relative velocity of an object, which exists in the lateral direction of a vehicle, with respect to the vehicle by a detection unit that is installed in the vehicle with a direction crossing the longitudinal direction of the vehicle as the central direction of detection;
a velocity calculating step of calculating the absolute velocity of the object in the vehicle width direction with respect to the traveling direction of the vehicle on the basis of a detection signal in the detection step; and
a determination step performed by a determination unit that is configured to determine:
  (i) whether or not the object is an approaching moving object on the basis of the relative velocity of the object with respect to the vehicle detected by the detection unit and a velocity component of the vehicle velocity in the direction from the vehicle to the object, and
  (ii) whether or not the object is an approaching moving object on the basis of the absolute velocity of the object in the vehicle width direction with respect to the traveling direction of the vehicle calculated in the velocity calculating step,
wherein when it is determined that the object is not approaching based on the relative velocity of the object, the determination unit determines whether the object is an approaching object based on the absolute velocity of the object.

6. An object detecting method comprising:
a detection step of detecting the relative velocity of an object, which exists in the lateral direction of a vehicle, with respect to the vehicle by a detection unit that is installed in the vehicle with a direction crossing the longitudinal direction of the vehicle as the central direction of detection;
a velocity calculating step of calculating the absolute velocity of the object in the vehicle width direction with respect to the traveling direction of the vehicle on the basis of a detection signal in the detection step; and
a determination step performed by a determination unit, that is configured to determine:
  (i) the collision possibility of the object and the vehicle on the basis of the absolute velocity of the object in the vehicle width direction with respect to the traveling direction of the vehicle calculated by the velocity calculating step and the absolute position of the object as well as the travel velocity and absolute position of the vehicle, and
  (ii) whether or not the object is an approaching moving object on the basis of the absolute velocity of the object in the vehicle width direction with respect to the traveling direction of the vehicle calculated by the velocity calculating step,
wherein when the determination unit determines the possibility of collision, the determination unit changes a threshold value for determining whether the object is an approaching moving object to a value by which a determination of an. approaching moving object is more quickly made and determines whether the object is an approaching moving object based on the absolute velocity of the object in the vehicle, width direction with respect to the traveling direction of the vehicle calculated by the velocity calculator.

* * * * *